Nov. 19, 1929.   H. C. HAGMAN   1,736,006
DENTAL ARTICULATOR
Filed Oct. 22, 1925   3 Sheets-Sheet 1
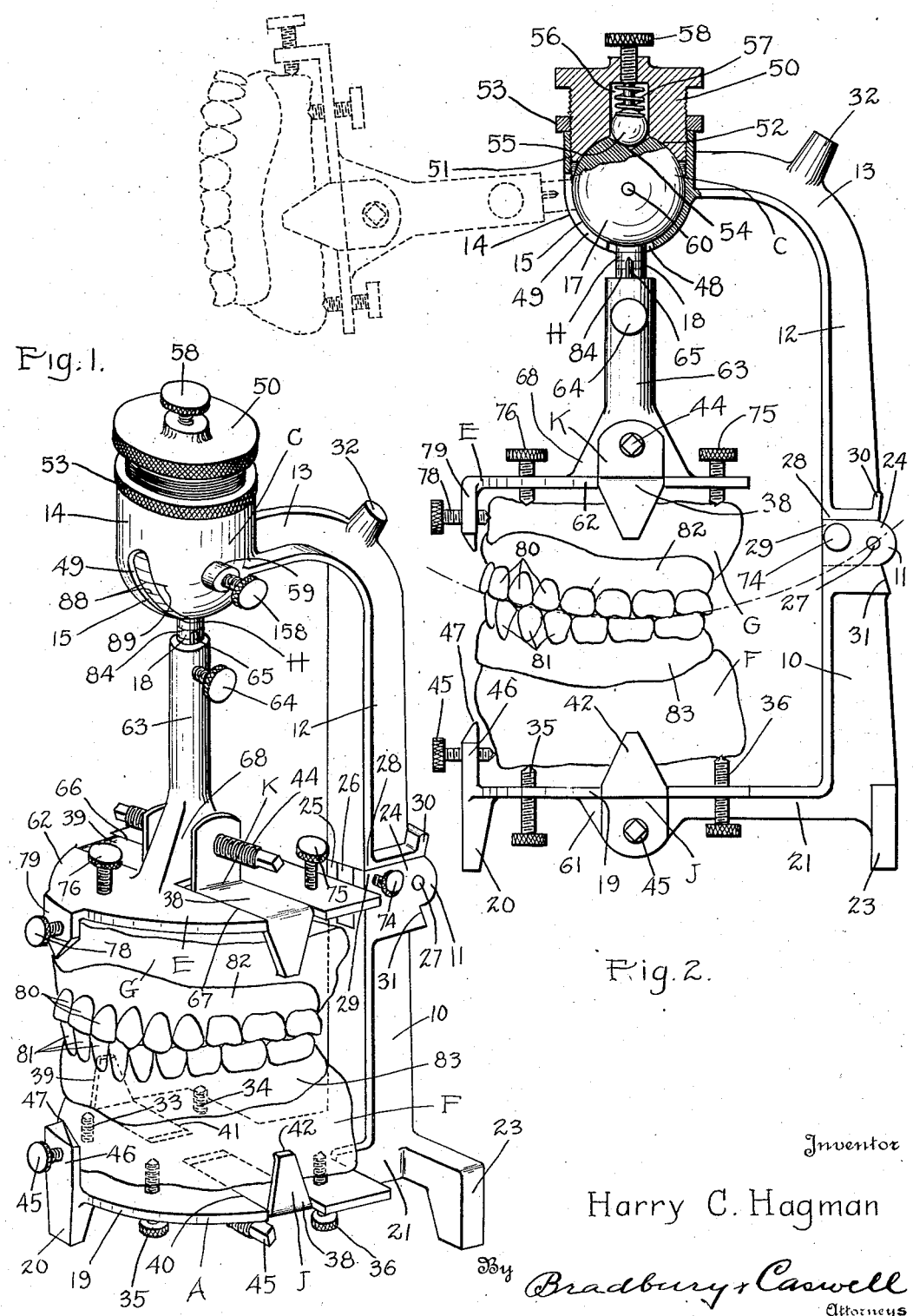
Inventor
Harry C. Hagman
By Bradbury & Caswell
Attorneys

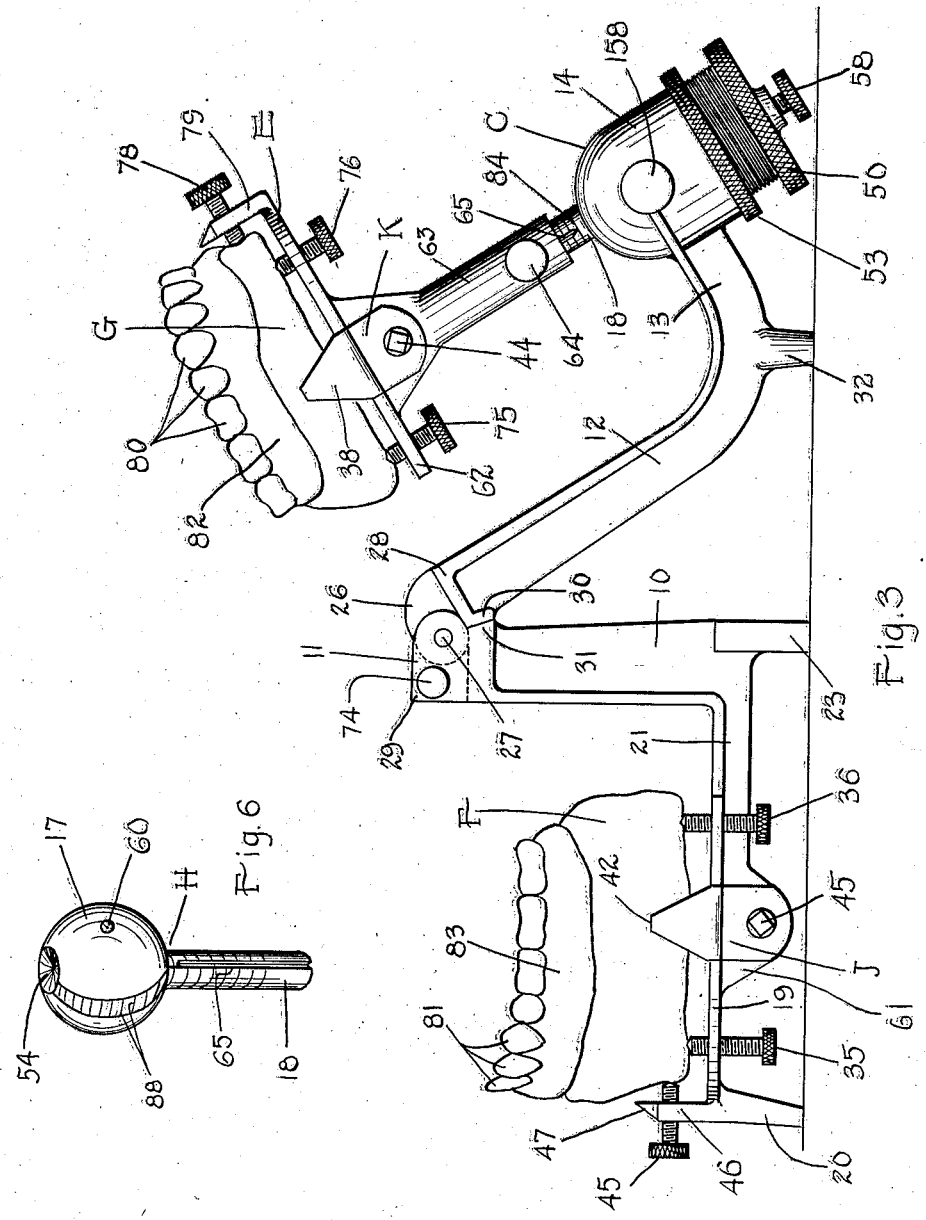

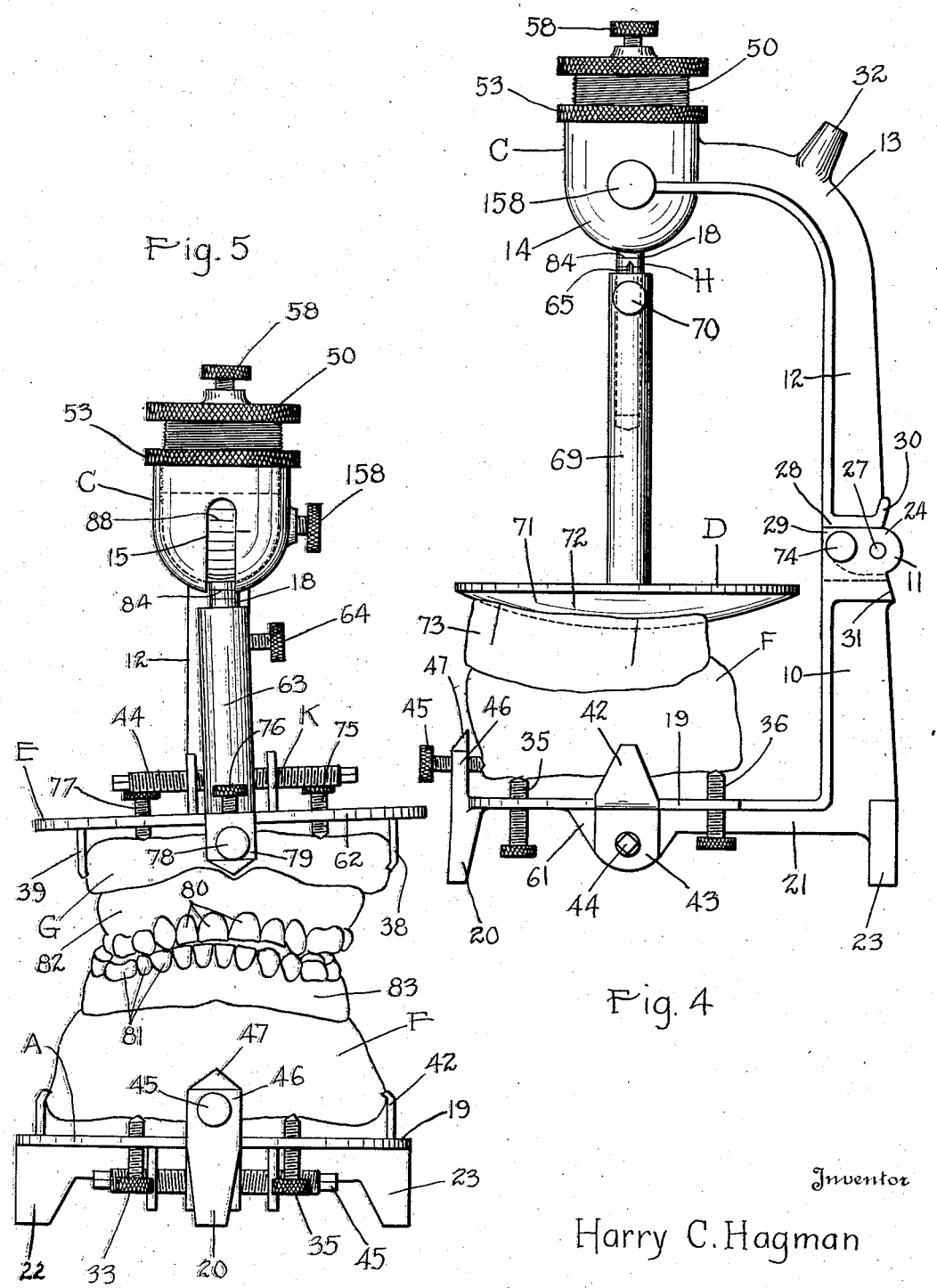

Patented Nov. 19, 1929

1,736,006

UNITED STATES PATENT OFFICE

HARRY CLIFFORD HAGMAN, OF MINNEAPOLIS, MINNESOTA

DENTAL ARTICULATOR

Application filed October 22, 1925. Serial No. 64,134.

My invention relates to dental articulators adapted to support casts or models of human teeth, models of human jaws bearing wax bites, wax trial plates, and sets of artificial teeth for the purpose of construction, study and experiment and has for its object to provide a device wherein the occluding and masticating movements of the natural teeth can be reproduced with models or teeth supported in the articulator, so that when construction of a restoration is completed, it will function properly in the mouth.

Another object resides in providing a frame for supporting the various elements of the device upon which the lower jaw model is mounted, which frame has an arm extending above and projecting over said jaw model and from which is universally suspended a member carrying a support for the upper jaw model.

Another object resides in providing a mounting plate to be used for permitting the lower jaw model to be properly positioned relative to the frame, while the same is being mounted upon said frame, which mounting plate is adapted to be interchanged with said upper jaw model support and attached to said universally suspended member.

A still further object of the invention resides in forming said mounting plate with a spherical surface adapted to come in contact with portions of the occluding surfaces of the teeth, trial plates or other lower jaw model to permit of properly positioning them as aforesaid.

Another object of the invention resides in providing a ball and socket joint or other type of universal joint for supporting said universally supported member, with clamp screws for limiting and defining the movement of said member.

A feature of the invention resides in hinging said arm at a point situated with respect to teeth or models corresponding to the condyles of the jaw.

A still further object resides in providing adjusting screws for adjusting the position of the models and to further provide clamps for holding them in position after they have been properly adjusted.

Other objects of the invention reside in the specific construction of the same.

The full objects and advantage of my invention will be found in the detailed description thereof, and are particularly pointed out in the claims.

In the drawings illustrating my invention:

Fig. 1 is a perspective view of an embodiment of my invention, the same having upper and lower models mounted thereon.

Fig. 2 is a side elevational view of the structure illustrated in Fig. 1, a portion thereof being shown in section.

Fig. 3 is a view similar to Fig. 2, the upper model or cast and support therefor being swung back.

Fig. 4 is a view similar to Fig. 2 illustrating the method of mounting a cast on the lower jaw member of the device.

Fig. 5 is a front view of the device shown in Fig. 2 illustrating the upper support in a laterally shifted position.

Fig. 6 is a perspective view of the ball element of the invention.

It has been found that the normal surfaces of occlusion of the human teeth coincide with the surface of a sphere approximately six to eight inches in diameter which has its center at a point situated above the roof of the mouth and intercepted by the long axes of the teeth. The relative movements of the lower jaw with respect to the upper jaw will be closely reproduced if the upper jaw be assumed to be universally pivoted at the center of said sphere, and articulated by swinging it about this center. My invention embodies the principles disclosed in the above theory.

Having reference to the drawings and particularly to Fig. 1, it will be noted that the invention proper comprises a frame A in which may be mounted the lower cast or model. This frame has an upright 10 to which is pivoted by means of a hinge 11 a swinging arm 12 which is formed with an overhanging portion 13. A hanger member H is suspended from the overhanging portion 13 of arm 12 by means of a ball and socket joint C and may carry the mounting plate D shown in Fig. 4 or the upper support E shown in the other figures. By means of clamps presently to be described, lower and upper models F and G may be mounted upon said supports. By swinging arm 12 back upon hinge 11 as shown in Fig. 3, ready access may be had to the lower model and to upper model, as well. By swinging the member E upwardly as shown in Fig. 2 in dotted lines, while arm 12 is in upright position, access to the upper model may be had. A detailed description of the construction and operation of the invention follows.

The frame A of the invention comprises an arcuate plate 19 which is formed with a foot 20 at the forward portion of the same. A member 21 issues rearwardly from this plate and connects with the upright 10, said member terminating in two spaced feet 22 and 23, which together with the foot 20 support the device with the plate 19 in elevated position above a work table or other supporting surface. The hinge 11 consists of two leaves 24 and 25 formed on upright 10 which straddle a leaf 26 formed on arm 12. These leaves are pivoted together by means of a pintle 27 which is rearwardly positioned permitting the arm 12 to fold back into the position shown in Fig. 3. Upon the forward portion of the arm 12 adjacent the leaf 26 are formed two shoulders 28 which abut against complemental shoulders 29 formed on the leaves 24 and 25. These shoulders serve to limit the closing movement of the arm 12 and to hold it in erect position. Similar angularly disposed shoulders 30 and 31 formed on the rear of said arm and upright serve to terminate the movement of said arm when it is folded back, so as to hold said arm in proper position when the frame A is grasped and lifted. To steady the device and prevent it from toppling over when the arm 12 is folded back, the same is provided with a foot 32 to bear upon the supporting surface upon which the feet 20, 22 and 23 rest. In this manner the device is always in equilibrium whether the arm 12 is folded back or in erect position.

The supporting structure for a lower model, as at F, comprises primarily four thumb screws 33, 34, 35 and 36 which are screwed into the plate 19 and upon which the model may rest. A clamp J is used for holding the model in position, the same consisting of two jaws 38 and 39 which are slidable in grooves 40 and 41 formed in plate 19. These jaws have claws 42 adapted to engage the model F and in addition are provided with depending threaded portions 43 adapted to receive a combined right and left screw 44. Upon rotation of this screw by means of a square head 45 formed on either end thereof, and a key or knob (not shown), the jaws 38 and 39 may be spread apart or brought together to grip the model F. This screw 44 passes freely through a depending rib 61, which connects the two portions of the plate 19 extending to the rear and forwardly of the slots 40 and 41. By means of this structure the clamp jaws 38 and 39 are confined to movement within the slots 40 and 41. In addition to these clamps I provide a thumb screw 45 which is screwed into a lug 46 extending upwardly from the plate 19 and which is adapted to engage the model F and to assist in holding it in position.

The ball and socket joint C comprises a socketed member 14 having a spherical socket 15 formed within the same. A circular opening 48 in the bottom of said member opens into an arcuate slot 49 extending upwardly therefrom. Within this member 14 is positioned a ball 17 having a stem 18 secured thereto and depending through said opening 48, said ball and stem constituting the hanger member H. The opening 48 is sufficiently large to permit member H to oscillate in all directions through given limits, while the slot 49 is of suitable width so that the stem 18 may swing through it to permit the member H to assume the position shown in dotted lines in Fig. 2. Ball 14 is retained within the socketed member 14 by means of a cap 50 threaded into the upper portion of said member as at 51. Cap 50 is formed with a spherical seat 52 engaging the ball 17 and holding it seated in the socketed member 14. When this cap has been properly adjusted it may be held in position by means of a lock nut 53 adapted to be turned on said cap and against the socketed member 14.

For yieldingly holding the member H against swinging movements, the ball 17 is formed at the top with a conical depression 54 in which is lodged a smaller ball 55. This ball is movable within a guide-way 56 formed in the cap 50 and is held in contact with the walls of the depression 54 by means of a compression coil spring 57 also positioned in said guide-way and bearing down upon the ball 55. In swinging the member H through its limits as determined by the opening 48, ball 55 is caused to be raised against the action of spring 57, due to the inclination of the slope of the depression 54. As soon as said member is released the spring 57 causes ball 55 to restore said member to its normal perpendicular position (Fig. 2). In this manner said member automatically returns to normal position. If it is desired to hold said member rigidly against swinging a screw 58 which is screwed into the cap 50 is turned to bear down upon the ball 55 and deprive the same of upward movement. In addition to the above structure I employ a screw 158 which is screwable in a boss 59 formed on the side of the socketed member 14 and which is adapted to become seated in a conical cavity 60 in the side of the ball 17. When so positioned this screw serves to confine the movements of member H in a single plane permitting it to swing only in the direction of slot 49.

Upon the spindle 18 of member H may be mounted either the mounting plate D or the support E. The latter is constructed as follows: This device comprises a plate 62 similar to the plate 19 from which issues upwardly a tubular sleeve 63 adapted to slide upon the stem 18. A thumb screw 64 is screwed into the upper portion of this sleeve and is provided with a conical point which is adapted to engage in a longitudinal V-shaped groove 65 formed in the stem 18. This screw serves to hold the support E in position on the member H and at the same time by engaging the groove 65 prevents rotational movement of said support relative to said stem.

Upon the plate 62 is positioned a clamp K similar in all respects to clamp J, which has a combined right and left screw 44, jaws 38 and 39, the same as clamp J, which jaws are movable in slots 66 and 67 formed in plate 62. The screw 44 of this clamp passes freely through an enlarged portion 68 of the sleeve 63 at the junction of said sleeve and plate. Employed in conjunction with the clamp K, are three screws 75, 76 and 77 similar to the screws 33, 34, 35 and 36 screwable in the plate 62 and a screw 78 corresponding to the screw 45 which is screwed into the lug 79 formed on said plate. This structure constitutes the support E which carries a model, as at G as previously pointed out.

The mounting plate shown in Fig. 4 consists of a sleeve 69 similar to sleeve 63 which is adapted to slip over stem 18 and to be held in place thereon by means of a thumb screw 70 which is adapted to engage the groove 65 the same as screw 64. At the end of this sleeve is formed a disc 71 whose surface 72 coincides with the surface of an imaginary sphere having its center at the center of the ball 17. The mounting plate D may be adjustably positioned along the stem 18 so that its surface 72 may coincide with that of the imaginary sphere aforesaid or may deviate slightly therefrom in either direction.

The device is particularly advantageous for the purpose of supporting models while building up restorations, though it may be used for many other purposes as for studying conditions of mal-occlusion from models and providing for the correction thereof, as well as the articulating of teeth on restorations. Such uses will become apparent from the following explanations. In employing the device for the purpose of building up dentures (Figs. 2 and 4), the mounting plate D is first attached to the stem 18 by means of the thumb screw 70 with the surface 72 of plate 71 the proper distance from the center of the ball and socket joint C, which is approximately four inches for the average case. Both screws 58 and 158 are then tightened down to hold the member H in its normal position as shown in Fig. 4, and arm 12 swung back (Fig. 3), as previously described. The wax bite 73 fitting the cast F is waxed to it and the assemblage positioned upon the disc 71 of the mounting plate D with the occluding surface of said wax bite in contact with the surface 72 of said plate. This structure is then centered on said disc 71. The entire assemblage may then be waxed in position upon said disc. Screws 33, 34, 35 and 36 are next lowered, screw 45 screwed outwardly and the clamps J opened. The arm 12 is now returned into its erect position (Fig. 4) with shoulders 28 and 29 of hinge 11 abutting. Screws 33, 34, 35 and 36 are next raised until they firmly engage the lower side of cast F so as to provide a support beneath the same. In adjusting these screws it is essential to hold the arm 12 from movement relative to the upright 10 and this may be accomplished manually or by means of a set screw 74 screwable into leaf 24 of upright 10 and engaging the leaf 26 of arm 12. The clamp J is now tightened to securely grip upon the sides of the cast F, the jaws thereof adjusting themselves to exert equal pressure upon both sides of the cast. The screw 45 is finally turned inward to engage the forward portion of the cast. In this manner the cast is firmly held in position upon its support with the occluding surface of the wax bite properly positioned in respect to the center of the ball and socket joint C. The mounting plate D is now loosened from the wax bite 73 and removed from support H. In place of this device is positioned the support E which is attached to the stem 18 by means of the screw 64. Upon the lower wax bite 73 is then placed in proper position the corresponding upper wax bite with its complemental cast, being cast G of the drawings. Support E is then properly lowered so that said cast may be received therein and the screws 75, 76 and 77 brought into engagement with said cast. Clamp K may now be tightened and screw 78 advanced which will rigidly hold the upper cast and wax bite in place. By loosening screws 158 and 58 the support E may be swung from its pivot as previously described for articulating the wax bites or the same may be swung outwardly as shown in dotted lines in Fig. 2 permitting of working upon the upper wax bite and of mounting the teeth 80 thereon. When arm 12 is swung back as shown in Fig. 3 the lower wax bite may be worked upon and the teeth 81 mounted thereon. In Figs. 1, 2, 3 and 5 I have shown trial plates 82 and 83 mounted in the device, Fig. 5 illustrating the device when the trial plates are in lateral occlusion. Upon completing the set-up of the teeth, the same may be articulated in the device by moving the upper support universally. In the articulation of the trial plates or jaw models it is essential that the suspended plate be able to move laterally in a manner such that a certain line therein, which I have termed the occlusal medial line, will, in any of its positions throughout the lateral movement of the suspended plate, be parallel to every other of its positions during such movement; that is to say, have lateral movement. This line is a line extending in an anterior posterior direction through the suspended jaw model or trial plate formed by the intersection of the occlusal and sagittal planes. Such movement is readily had in the structure embodying my invention. To permit of accurate replacement of the upper support on stem 18, this stem is formed with reference marks 84 which may be registered with the top of the sleeve 63.

The device may also be used with tooth models adapted to be positioned and mounted upon the supports instead of wax bites or trial plates. In instances where it is advisable to provide for protrusion or retrusion of a patient's lower jaw, the tooth models are applied to the device in their normal relation in the manner above described. Screw 58 is then released and the upper model set in the desired new relation and waxed to the lower model. Clamp J and screws 33, 34, 35, 36 and 45 are then released from said lower model and the screw 58 reset, whereupon said screws 33, 34, 35, 36 and 45 and the clamp J are readjusted. The models, thus disposed within the device in the desired new relation, may be studied and appropriate reconstruction effected. After the upper model has been waxed in its new relation on the lower model, the departure from the natural relation thereof may be noted on a scale comprising reference marks 88 in the ball 17, which marks parallel an index mark 89 on the member 14.

The advantages of my invention are manifest. The device is highly efficient. By means of the mounting plate D the models can be accurately and quickly positioned. By means of the clamps and set screws models may be easily and quickly mounted eliminating the cumbersome method of employing plaster of Paris. After mounting, the work is readily accessible permitting restorations being successfully built up and allowing the parts to be conveniently articulated.

Having described my invention in the form which I consider to represent the best embodiment thereof, I desire to have it understood that the invention may be constructed in different ways and put to uses other than those disclosed, within the scope of the following claims:

1. An articulator comprising a frame, a support formed on said frame for holding a lower jaw model, an arm extending upwardly from said support, a ball and socket joint carried by said arm, the center of said ball and socket joint substantially coinciding with the center of a sphere whose surface conforms with the surface of occlusion of said lower jaw model and a second support for an upper jaw model suspended from said ball and socket joint.

2. An articulator comprising a frame, a support formed on said frame for holding a lower jaw model, an arm extending upwardly from said support, a ball and socket joint carried by said arm, the center of said ball and socket joint substantially coinciding with the center of a sphere whose surface conforms with the surface of occlusion of said lower jaw model and a second support for an upper jaw model suspended from said ball and socket joint, and a hinge in said arm situated substantially in the surface of said sphere.

3. An articulator comprising a frame, a support thereon for holding a jaw model, a second support superimposing said first support for holding a complemental jaw model, a movable hanger for said second support hung from said frame, and a ball and socket joint situated at the end of said hanger, the center of said ball and socket joint coinciding substantially with the center of a sphere, whose surface conforms to the surface of occlusion of one of said jaw models.

4. An articulator comprising a frame, a support thereon for holding a jaw model, a second support superimposing said first support for holding a complemental jaw model, and a movable hanger for said second support hung from said frame, for oscillation about a plurality of horizontal axes passing through a point situated at the center of a sphere whose surface conforms to the surface of occlusion of one of said jaw models.

5. An articulator comprising a frame, including an upwardly extending member, a support on said frame for holding a jaw model, a second support superimposing said first support for holding a complemental jaw model, a movable member for said second support, a ball secured to one of said members, a socketed member secured to the other of said members co-operating with said ball, for permitting universal movement of said movable member, means for guiding said movable member for movement in one plane and means limiting the movement of said movable member the same amount in all other planes.

6. An articulator comprising a frame, a support thereon for holding a jaw model, a second support superimposing said first support for holding a complemental jaw model, a movable hanger for said support, a ball secured to said hanger, a socketed member secured to said frame for supporting said ball, for universal movement, said socketed member having a circular opening through which said hanger extends, and having a peripheral slot communicating therewith, said opening being of larger diameter than said hanger.

7. An articulator comprising a frame including an upwardly extending member, a support on said frame for holding a jaw model, a second support superimposing said first support for holding a complemental jaw model, a movable member for said support, a ball secured to one of said members, a socketed member secured to the other of said members co-operating with said ball for permitting universal movement of said movable member, said ball being formed with a depression therein and a spring retained member movable into and out of said depression for yieldingly forcing said ball back to normal position.

8. An articulator comprising an upright frame, a model support at the base thereof, a second model support superimposing said first support, a hanger for said second support hung from said frame for universal swinging movement, and releasable means for holding the hanger against swinging, except through one plane.

9. An articulator comprising a frame, a support thereon for holding a jaw model, a second support superimposing said first support for holding a complemental jaw model, a movable hanger for said support, a ball secured to said hanger, a socketed member secured to said frame for supporting said ball for universal movement, said ball being formed with a conical depression, a guideway formed in said socketed member, a member movable along said guideway and adapted to engage said ball within said depression, and a spring for forcing said member against said ball, the wall of said depression being sloped to cause said member to return said ball to normal position through the action of said spring.

10. An articulator comprising a frame, a support formed on said frame for holding a lower jaw model, an arm extending upwardly from said support, a universal joint carried by said arm, the center of said joint substantially coinciding with the center of a sphere whose surface conforms with the surface of occlusion of said lower jaw model, and a second support for an upper jaw model suspended from said universal joint and adapted to swing thereon, said second support being adapted to revolve relative to said arm concurrently with the universal swinging thereof.

11. An articulator comprising a frame, a support thereon for holding a jaw model, a second support superimposing said first support for holding a complementary jaw model, a movable hanger for said second support, a ball secured to said hanger, a socketed member secured to said frame for supporting said ball for universal movement, said ball being formed with a conical depression, a guideway formed in said socketed member, a member movable along said guideway and adapted to engage said ball for returning the same to normal position, and means for holding said member in engagement within said conical depression.

12. An articulator comprising a frame, a member pivoted to said frame for universal movement, a finder member detachably mounted upon said pivoted member, said finder member having a spherical surface whose center substantially coincides with the center of the pivot of said pivoted member, means for supporting a jaw model upon said frame with the surface of occlusion thereof in contact with said finder, and means for permitting the adjustment of said finder along the line passing through the center of the pivot of said pivoted member.

13. The process of mounting jaw models for articulation in an articulator having a model support pivoted for universal movement, which consists in attaching a finder having a spherical surface to said model support with its center substantially at the center of said universal pivot, restraining said model support from movement, positioning a jaw model with the surface of occlusion thereof in contact with the spherical surface of said finder, securing said jaw model in adjusted position upon the articulator, removing said finder, attaching a jaw model mounting upon said pivoted model support in occlusion with said first jaw model, and in securing said second jaw model upon said mounting in such occluded position of said second jaw model.

14. The process of mounting jaw models for articulation in an articulator having a model support pivoted for universal movement, which consists in attaching a finder having a spherical surface to said model support with the periphery thereof at a distance from the point of pivot of said model support equal to the radius of a sphere whose surface conforms to the surface of occlusion of the jaw model to be mounted therein, restraining said model support from movement, positioning the particular jaw model with the surface of occlusion thereof in contact with the spherical surface of said finder, securing said jaw model in adjusted position upon the articulator, removing said finder, attaching a jaw model mounting to said pivoted model support, positioning the complemental jaw model in occlusion with said first jaw model and in securing said second jaw model upon said mounting in such occluded position of said second jaw model.

15. An articulator comprising a frame member, a model support at the base thereof, another member pivoted to said frame member and superimposing said model support, a second model support on said second member, a cam attached to one of said members and spring actuated means engaging said cam for forcing said members upon swinging thereof back to a normal predetermined position.

16. An articulator comprising a frame, a support universally pivoted to said frame, means adapted to hold a finder having a spherical surface with the center thereof substantially at the center of pivot of said support and means for holding a jaw model in contact with the spherical surface of said finder.

17. An articulator comprising a frame, an arm extending upwardly from said frame, a depending member universally pivoted to said upwardly extending arm, means adapted to hold a finder having a spherical surface with the center thereof substantially at the center of said pivot and means for holding a jaw model in contact with the spherical surface of said finder.

18. An articulator comprising a frame, a support universally pivoted to said frame, means adapted to interchangeably hold a finder having a spherical surface and a jaw model, with the center of the surface of said finder and the center of the occlusal sphere of said jaw model substantially at the center of said pivot, and means for supporting a second jaw model so as to contact with said finder and occlude with said first named jaw model.

19. An articulator comprising a frame, a support thereon for holding a jaw model, a second support opposite said first support for holding a complemental jaw model, a movable member for carrying said second support, a hinge structure for universally pivoting said movable member situated at a point substantially coinciding with the center of a sphere whose surface conforms with the surface of occlusion of a lower jaw model mounted on said first named support, said hinge structure permitting lateral parallel movement of the occlusal medial line of a second jaw model carried by said second support.

In testimony whereof, I have signed my name to this specification.

HARRY CLIFFORD HAGMAN.